Aug. 9, 1966    W. E. SANFORD, JR    3,265,343
HOLDER FOR DIAL INDICATORS
Filed Dec. 7, 1964

INVENTOR.
Walter E. Sanford, Jr
BY
William F. Woods
ATTORNEY

United States Patent Office 3,265,343
Patented August 9, 1966

3,265,343
HOLDER FOR DIAL INDICATORS
Walter E. Sanford, Jr., 484 W. County Road J.,
St. Paul 12, Minn.
Filed Dec. 7, 1964, Ser. No. 416,567
5 Claims. (Cl. 248—205)

This invention relates to an improved device for machine tools; in particular, it concerns an adapter for holding dial indicators, of the type frequently used in metal and plastic machining operations. It is well known that fabrication and production shops working with metal and plastic materials use a variety of machines and processes to product a finished product. For example, a shop may have a dozen or more different machines such as milling machines, machines for broaching, jig bore machines and the like. In order to check the accuracy of the work performed by these machines, it is common practice to use a dial indicator by inserting the upper stem of the indicator into the tool engaging jaws or collet of the machine and positioning the work engaging leg of the indicator into contact with the work. Orindarily, the jaws or collets of the several machines in a shop are each preset with respect to their internal chuck diameter to accomodate the particular tool which is being used at a specific time and for a specific job. Thus a milling machine may be set up for a ½" end mill, a jig bore may be chucked for ¾" and a broaching machine may be set up for a ⅝" tool. Inasmuch as the upper stem of the indicator is approximately 3/16" in diameter it is apparent that each of the spacing of the jaws or collets in the examples given would have to be reduced in order to receive the indicator. And in many cases a special size collet or holding device is necessary to permit the mounting of the indicator in the machine. These efforts require extra effort, time and labor, add to the cost of the machining operation and are disadvantageous, both from the standpoint of efficiency as well as convenience.

It is, therefore, an important object of this invention to overcome the above disadvantages and limitations by providing an adapter that will permit the mounting of an indicator in a wide range of machines without the necessity of making the changes mentioned. Other objects of the invention are: to provide an improved holder for a dial indicator having means for releasably engaging the indicator together with means for mounting the indicator in jaws or collets of a machine generally irrespective of the spacing set up in the said jaws or collets; to provide an improved device of this type that can be readily manufactured of easily available materials, is highly versatile and dependable in operation, and rugged and long wearing in service.

My invention is an attachment or adapter for facilitating the easy mounting of dial indicators, of the type frequently used in metal and plastic fabricating, in various machine tools such as jig bores, broaching machines, milling machines and the like generally irrespective of the spacing set up in the jaws or collets of the machine. The device is characterized by a unitary body having a series of outer concentric circular edges or supporting shoulders each of varying radii which fit into machines having different internal diameters set up in their tool holding jaws. An internal bore and spring serve to releasably hold the dial indicator at the end of the device remote from the machine to which it is attached.

Figure 1:
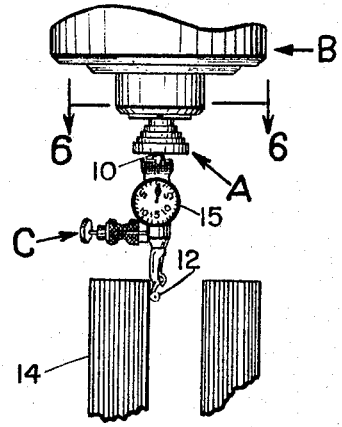
FIGURE 1 is a fragmentary elevational view showing the invention mounted for use in a milling machine.
Figure 2:
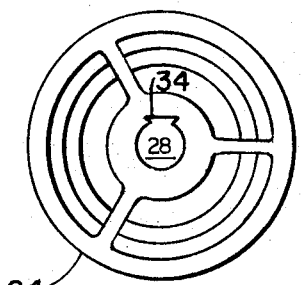
FIGURE 2 is an elevational view of one end of the invention shown in FIGURE 3.
Figure 3:
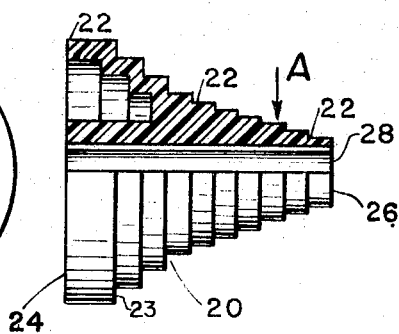
FIGURE 3 is a longitudinal half sectional view of the invention.
Figure 4:
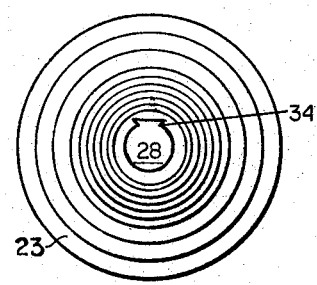
FIGURE 4 is an elevational view of an end of the invention shown in FIGURE 3.
Figure 5:
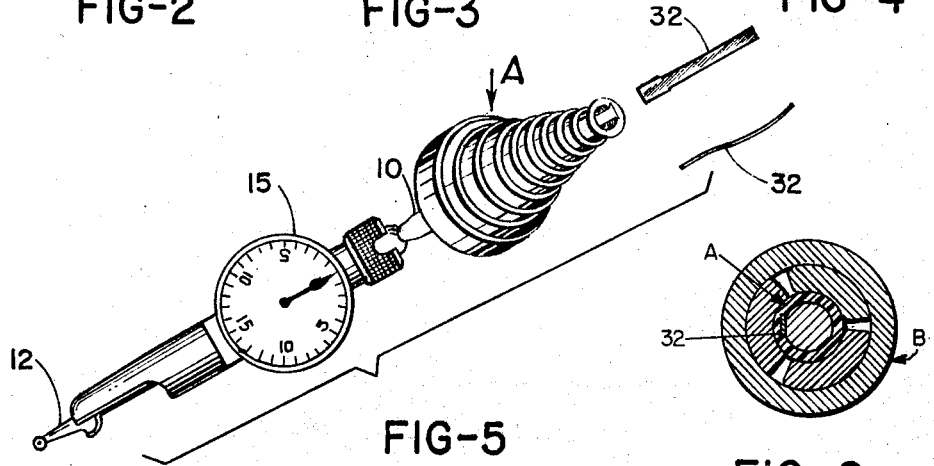
FIGURE 5 is a perspective and exploded view of the invention illustrating its working relationship to a dial indicator.
Figure 6:
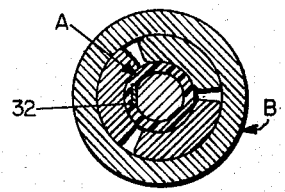
FIGURE 6 is an enlarged view, partially in section, taken on the line 6—6 of FIGURE 1.

Turning now to the drawing, the invention, indicated in its entirety by the reference character A, is shown in FIGURE 1 mounted in the jaws of a milling machine B and supporting a dial indicator C. The dial indicator C is of the conventional type having an upper stem 10 and a lower work engaging leg 12 which, upon contact with the work 14 acted upon by the mill B, moves a pointer 15 in dial C to thereby indicate the accuracy etc. of the machining operation. As illustrated in FIGURES 3 and 4, the device A includes a body 20 formed of either plastic or metal and characterized by a generally frusto-conical shape having a series of longitudinally extending circular jaw engaging concentric surfaces 22 which diminish in their radial extent from one end, as at 24, to the opposite end, as at 26. The axial length of each surface 22 is substantially the same; they are of sufficient extent to permit them to fit into and be engaged by the jaws or collets of a machine tool. The annular surfaces 23 between each shoulder 22 may abuttingly engage the lower end of the jaws or collets of the machine. The body 20 of the device A is further provided with an internal lengthwise bore 28 into which is milled a slot 34 for the purpose of mounting therein an internal flat spring 32. Spring 32 releasably biases the device A into surrounding engagement with the stem 10 of the indicator C in the manner illustrated in FIGURES 5 and 6.

When the device A is mounted in place on stem 10 of the indicator C and releasably held thereon by spring 32, it is apparent that the radially different surfaces 22 of the device permit the insertion of the indicator C into a variety of machine collets or jaws without the necessity of changing the internal spacing of the jaws or collets each time a tool is removed and an indicator inserted therein for the purpose of checking the work. This feature saves considerable time in machining operations as in most cases the drill or other cutting tool used in a machine is different in diameter from the diameter of the stem 10 of the indicator. And the device permits the use of a single indicator in a shop having several machines utilizing tools of varying tool engaging internal diametral dimensions without changing the collet or jaw spacing for each use of the indicator.

My invention may be made of steel or, preferably, formed of suitable plastic material. It is evident that changes within the skill of those versed in the art may be made without departing from the spirit of the invention. It is intended that the patent shall cover, by summarization in the appended claims, all features of patentable novelty residing in the invention.

I claim:

1. In a holder for dial indicators,
    a body characterized by a generally frusto-conical shape and having a central longitudinal bore therein,
    a series of circular concentric machine tool jaw engaging shoulders provided exteriorly of said body and extending from one end to the other thereof,
    said shoulders each being of different radial extent and being adapted to engage the varying internal bores of the jaws and collets of different machine tools, and
    means for releasably holding the stem of a dial indicator within the bore of said body.

2. The device described in claim 1 wherein said means for releasably holding the stem of a dial indicator within the bore of said body includes a spring member.

3. In a holder for dial indicators, said holder being adapted for mounting dial indicators in different machines without changing their tool holding jaws or collets, the combination comprising:
a body characterized by a generally frusto-conical shape and having a longitudinal central bore therein,
said body having a radially enlarged end and a radially diminished end,
a series of radially differing axially continuous circular jaw engaging shoulders formed exteriorly of said body,
each of said shoulders decreasing in their radial extent from the enlarged end of said body to the diminished end of said body whereby to form a series of radially differing jaw engaging surfaces, and
means for releasably mounting an indicator stem in the said bore of said body.

4. The structure defined in claim 3 wherein said mounting means consists of a spring member.

5. In a holder for dial indicators adapted for mounting a dial indicator in different machine tools without changing their tool holding jaws or collets, the combination comprising:
a body of a generally frusto-conical shape and having a longitudinal central bore therein,
said body having a radially enlarged end and a radially diminished end and having a slot therein in communication with the said bore,
a series of radially differing axially continuous circular jaw engaging shoulders formed exteriorly of said body,
each of said shoulders decreasing in their radial extent from the enlarged end of said body to the diminished end thereof whereby to form a series of radially different jaw engaging surfaces therefor, and
a spring member mounted in the said slot for releasably holding a dial indicator.

References Cited by the Examiner

UNITED STATES PATENTS

| | | | |
|---|---|---|---|
| 1,209,362 | 12/1916 | Turner | 77—71 |
| 1,841,635 | 1/1932 | Salmon | 76—108 |
| 2,046,917 | 7/1936 | Kinsbury | 74—217 |
| 2,202,811 | 6/1940 | Carney et al. | 248—217 |
| 2,383,212 | 8/1945 | Pohle | 77—71 |

CLAUDE A. LE ROY, *Primary Examiner.*

J. F. FOSS, *Assistant Examiner.*